United States Patent [19]

Sugalski

[11] 4,209,737
[45] Jun. 24, 1980

[54] APPARATUS FOR CHARGING CAMERA CELLS THROUGH FLASH BULB PACKAGE RECEPTACLE

[75] Inventor: Raymond K. Sugalski, Gainesville, Fla.

[73] Assignee: General Electric Company, Gainesville, Fla.

[21] Appl. No.: 882,238

[22] Filed: Feb. 28, 1978

[51] Int. Cl.² .......................... H02J 7/00; G03B 15/03
[52] U.S. Cl. ........................................ 320/2; 354/126
[58] Field of Search ........................................ 320/2–5, 320/25, 54, 29; 354/60 R, 60 F, 126; 315/241 P

[56] References Cited

U.S. PATENT DOCUMENTS

| | | | |
|---|---|---|---|
| 3,017,559 | 1/1962 | Mallory | 320/2 X |
| 3,544,877 | 12/1970 | Erath | 320/2 |
| 4,080,557 | 3/1978 | Hennion | 320/2 |
| 4,131,351 | 12/1978 | Iwata et al. | 354/60 F |

FOREIGN PATENT DOCUMENTS 1021807  3/1966  United Kingdom ..................... 354/126

*Primary Examiner*—Robert J. Hickey
*Attorney, Agent, or Firm*—Morgan, Finnegan, Pine, Foley & Lee

[57] ABSTRACT

A charger for recharging electrochemical cells contained within a camera having a flash bulb package receptacle. A charging cord mechanically and electrically adaptable to the flash bulb package receptacle is utilized to connect the charger to the camera, thereby obviating the necessity of creating a secondary opening in the envelope of the camera to accommodate the charger. Modification of the internal circuitry of the camera shutter timing and flash system permits the charging of the camera cells through the flash bulb package receptacle without interfering with the operation of the camera in its normal mode of operation.

18 Claims, 2 Drawing Figures

APPARATUS FOR CHARGING CAMERA CELLS THROUGH FLASH BULB PACKAGE RECEPTACLE

BACKGROUND OF THE INVENTION

This invention relates to low cost apparatus for charging cells in cameras containing a flash bulb package receptacle. In particular, it relates to apparatus for charging cells located within the camera through the flash bulb package receptacle, thereby obviating the necessity of disturbing the camera envelope to create a secondary opening for accommodating the charging apparatus.

Many flash operated cameras, particularly those used by amateur photographers, utilize some type of external flash bulb package comprising a number of individual flash bulbs. The flash bulb package is electrically and mechanically adapted to the camera by means of a flash bulb package receptacle.

Conventionally, several approaches are available to energize the individual flash bulbs. One approach employs a self-contained non-rechargeable cell in the flash bulb package. After all of the flash bulbs in the package have been extinguished, the package is discarded. A variation of this approach employs a self-contained non-rechargeable cell in the film pack. After all of the film has been used the pack is discarded. In both of these approaches the self-contained cell is discarded along with the flash bulb package or the film pack.

It is apparent that one of the major drawbacks associated with both of these conventional approaches is the inefficiency and waste associated with the use of disposable non-rechargeable cells. In addition, related problems associated with disposal of the cells, such as environmental pollution, are also encountered.

Many flash operated cameras with automatic exposure mechanisms, either of the aperature or shutter type, utilize one or more cells located within the camera to activate the exposure mechanism. In this type of camera the internal cells typically experience a relatively high current drain. Accordingly, if cells of the non-rechargeable type are utilized the high current drain requirement neccessitates frequent replacement of the cells, and the drawbacks discussed previously with respect to the utilization of disposable non-rechargeable cells are applicable. Furthermore, the benefits to be derived from the use of rechargeable cells, particularly those comprising nickel cadmium, in conjunction with flash photography applications are totally lacking. The basic advantages inherent in the use of rechargeable, or secondary, cells compared to non-rechargeable, or primary, cells include long operating life; ability to operate at both low and high temperatures; long storage life; a nearly-constant discharge voltage characteristic; and high rate discharge capability. All of these advantages are particularly desirable in the area of flash photography.

The primary drawback associated with the use of rechargeable cells in flash operated automatic exposure cameras concerns the lack of means for conveniently recharging the internal cells. Typically, the addition of a secondary opening to accommodate the charging apparatus is required. However, this is undesirable from a manufacturing, reliability, cost and operational standpoint.

Usually camera flash bulb package receptacles are a standard size, whereas the internal camera cells can be of many sizes and shapes. Accordingly, charging apparatus electrically and mechanically adaptable to the camera flash bulb package receptacle is highly desirable as a convenient means of charging the internal cells. Such apparatus would allow the charging of cells in place, and obviate the necessity of secondary openings, special receptacles or charging adapters.

The need for low cost charging apparatus capable of charging internal batteries without disturbing the integrity of the camera envelope is deep-felt in the area of amateur photography.

Accordingly, it is an object of the invention to provide apparatus for charging internal batteries in cameras containing a flash bulb package receptacle. More specifically, it is an object of the invention to overcome the drawbacks associated with the aforementioned conventional approaches.

It is a further object of the invention to provide a simple low cost charging system capable of recharging internal batteries in a camera having a flash bulb package receptacle without destroying the integrity of the camera envelope by creating a secondary opening to accommodate the charging system.

SUMMARY OF THE INVENTION

The foregoing and other objects and advantages which will be apparent in the following detailed description of the preferred embodiment are achieved by the invention disclosed herein, which generally may be characterized as apparatus for charging electrochemical cells contained within a camera having a flash bulb package receptacle comprising:

(a) a charging circuit having a positive terminal and a negative terminal and including a source of charging current;

(b) plug means connected to the charging circuit terminals and adapted to be mechanically and electrically received by the flash bulb package receptacle; and (c) circuit means for providing a charging path in series with at least one rechargeable cell.

DETAILED DESCRIPTION OF PREFERRED EMBODIMENT

Figure 1:
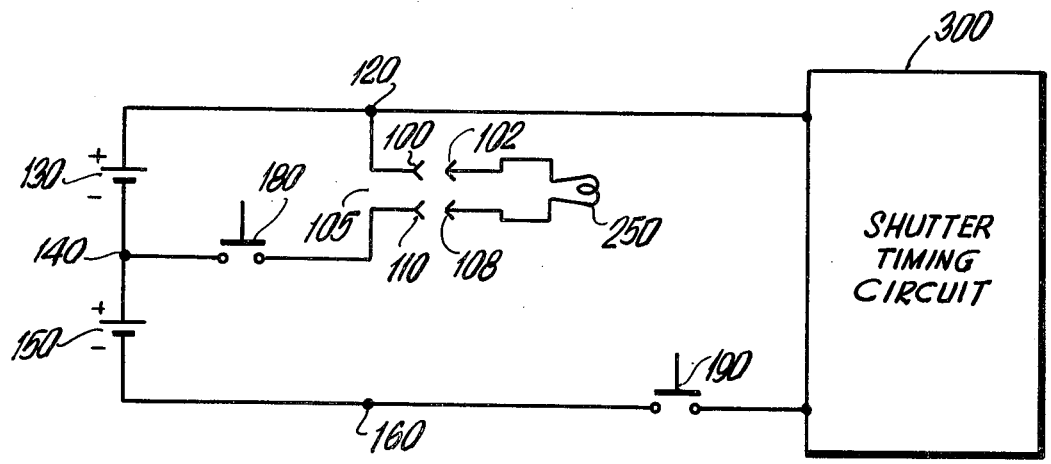
FIG. 1 is a schematic diagram of a representative camera shutter timing and flash system.

To better understand and appreciate the present invention and its advantages, it is helpful to understand in general, the operation of a representative automatic exposure camera of the shutter timing type which includes a flash system. The electrical circuit of such a camera is illustrated in the schematic diagram of FIG. 1.

In the cameras now commonly used, batteries 130 and 150, which are connected in series, are typically, non-rechargeable alkaline batteries. The positive terminal of battery 130 is electrically connected to circuit node 120 and the negative terminal is electrically connected to circuit node 140. Similarly, the positive terminal of battery 150 is electrically connected to circuit node 140 and the negative terminal is electrically connected to circuit node 160. An external flash bulb package 250 is electrically connected to the camera flash system by means of positive male connector 102 and negative male connector 108. Connectors 102 and 108 are mechanically compatible with corresponding female connector receptacles 100 and 110 of flash bulb package receptacle 105. In normal operation batteries 130 and 150 supply current to the automatic shutter timing unit and to the flash system when a flash bulb, flash cube or other type of light source is plugged into the flash bulb package receptacle 105.

Switches 180 and 190 are controlled by the shutter release mechanism button (not shown). The shutter timing circuit 300 draws current from series connected batteries 130 and 150 as soon as the shutter control mechanism button is slightly depressed. On the other hand, the flash bulb package 250 does not begin to draw current from battery 130 until the shutter release mechanism button is fully depressed.

It is apparent that in the normal flash mode of operation, the shutter timing circuit 300 is energized by means of series connected batteries 130 and 150 prior to, and independent of, the energization of flash bulb package 250. That is, switch 190 closes as soon as the shutter release mechanism button is slightly depressed, whereas switch 180 remains open until the shutter release mechanism button has been fully depressed. In normal operation batteries 130 and 150 are discarded and replaced after they have been depleted of their electrical energy.

Figure 2:
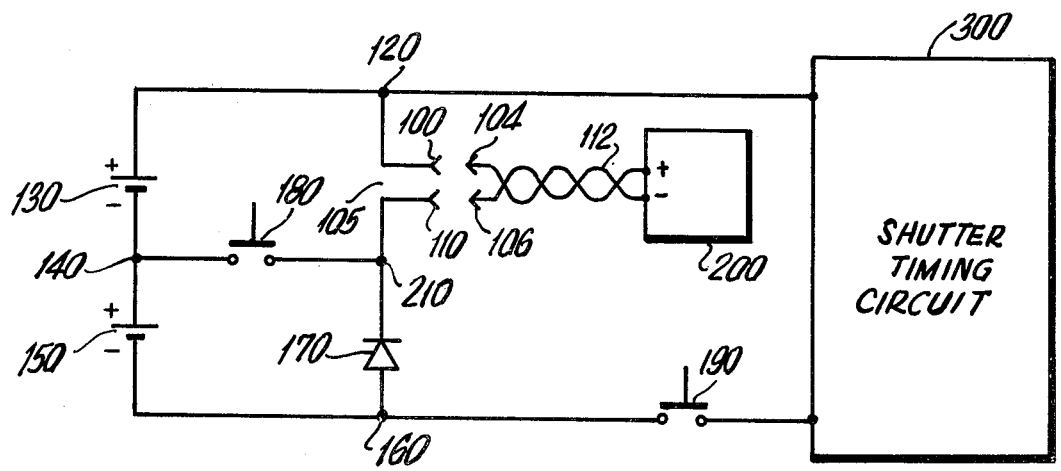
FIG. 2 is a schematic diagram of the preferred embodiment of the apparatus for charging camera cells through the flash bulb package receptacle, in accordance with the present invention.

Referring now to FIG. 2, a schematic diagram of the preferred embodiment of the present invention is illustrated. For convenience, the invention is described in the context of its implementation in, or application to the camera circuit of FIG. 2. A conventional charging circuit 200, preferably a wall mounted transformer unit, is electrically connected to the camera flash bulb package receptacle 105 by means of flexible charging cord 112 which includes a plug having a positive male connector 104 and a negative male connector 106. Connectors 104 and 106 are designed to be mechanically compatible with the corresponding female connectors 100 and 110 of flash bulb package 105.

In utilizing the circuitry depicted in FIG. 2, charging circuit 200 is electrically and mechanically connected to flash bulb receptacle 105 by means of charging cord 112. Normally switches 180 and 190 are both open. General purpose diode 170 completes the charging path from the positive terminal 104 of charging circuit 200 to the negative terminal 106 of the charging circuit, thereby allowing the series arrangement of rechargeable batteries 130 and 150 to be charged. Preferably, rechargeable batteries 130 and 150 are of the nickel cadmium type.

The employment of diode 170 between circuit nodes 160 and 210, provides an extremely simple low cost but effective adaptation of the internal circuitry of the camera shutter timing and flash system to external charging. Thus, low current charger module 200 can be mated directly to the camera, using the camera flash bulb package receptacle 105 as the current transfer point and, thereby avoiding the necessity of creating a secondary opening in the envelope of the camera to accommodate the external charging circuit.

Referring again to FIG. 2, an alternate method of charging in conjunction with the shutter release mechanism button (not shown) is described. In this method charging cord 112 is constructed such that it can not be electrically activated until the shutter release mechanism button is slightly depressed. In this mode of operation, it is essential that switch 180 remain open, otherwise the charging path would only include battery 130. As discussed previously, the shutter timing circuit 300 is energized by means of series connected batteries 130 and 150 prior to, and independent of, the energization of flash bulb package receptacle 105. The addition of diode 170 does not change this mode of operation. Since switch 190 closes as soon as the shutter release mechanism button is slightly depressed and switch 180 remains open until the shutter release mechanism button is fully depressed, a shutter release mechansim button with a built-in interlock molded into the plunger at the appropriate depth, thereby ensuring that switch 190 is closed and switch 180 remains open, is easily constructed using any of a number of standard detent interlock arrangements. The built-in interlock feature obviates the necessity for the user to manually maintain the shutter release mechanism button at the proper depth for a predetermined period of time.

Although the above discussion of the preferred embodiment of the present invention is in terms of a camera shutter timing and flash system utilizing two rechargeable cells, this is not essential to the practice of the invention. The operation of the circuit depicted in FIG. 2 with only one rechargeable cell 130 is identical, provided circuit node 140 is electrically connected to circuit node 160. As long as the anode of diode 170 is electrically connected to the negative terminal of cell 150 when two cells in series are used, or is connected to the negative terminal of cell 130 when only one cell is used, the circuit operation in the charging mode is identical. In either case, diode 170 provides circuit means for completing the charging path between the negative terminal of the cell 130, or cells 130, 150, being charged and the negative terminal 106 of charging circuit 200.

What is claimed is:

1. Charging apparatus for charging an electrochemical cell contained within a camera having a flash apparatus receptacle comprising, in combination:
   (a) a rechargeable cell housed within the camera and connected in circuit with the flash receptacle;
   (b) a charging circuit having a positive terminal and a negative terminal and including a source of charging current;
   (c) plug means connected to the charging circuit terminals and adapted to be mechanically and electrically received by the flash apparatus receptacle; and
   (d) circuit means for providing a charging path in series with the rechargeable cells, whereby the rechargeable cell may be recharged in situ via current supplied thereto via the flash apparatus receptacle.

2. A charger as recited in claim 1, wherein the charging circuit includes a transformer.

3. A charger as recited in claim 2, wherein the plug means includes a flexible charging cord connected to the transformer at one end and having a flash apparatus receptacle compatible plug at the other end.

4. A charger as recited in claim 3, wherein the circuit means comprises a diode electrically connected in series between the negative terminal of the rechargeable cell and the negative terminal of the charging circuit.

5. Charging apparatus for charging the electrochemical cells contained within a camera having a flash apparatus receptacle comprising, in combination:
   (a) a rechargeable cell housed within the camera and connected in circuit with the flash receptacle;

(b) a charging circuit having a positive terminal and a negative terminal and including a source of charging current;
(c) plug means connected to the charging circuit terminals and adapted to be mechanically and electrically received by the flash apparatus receptacle; and
(d) circuit means for providing a charging path in series with at least one rechargeable cell, whereby the rechargeable cell may be recharged in situ via current supplied thereto via the flash apparatus receptacle.

6. A charger as recited in claim 5, wherein the charging circuit includes a transformer.

7. A charger as recited in claim 6, wherein the plug means includes a flexible charging cord connected to the transformer at one end and having a flash apparatus receptacle compatible plug at the other end.

8. A charger as recited in claim 7, wherein the circuit means comprises a diode electrically connected in series between the negative terminal of the rechargeable cell and the negative terminal of the charging circuit.

9. Charging apparatus for charging an electrochemical cell contained within a camera having a shutter release mechanism button and a flash apparatus receptacle comprising, in combination:
(a) a rechargeable cell housed within the camera and connected in circuit with the flash receptacle;
(b) a charging circuit having a positive terminal and a negative terminal and including a source of charging current;
(c) plug means connected to the charging circuit terminals and adapted to be mechanically and electrically received by the flash apparatus receptacle;
(d) circuit means for providing a charging path in series with the rechargeable cell, whereby the rechargeable cell may be recharged in situ via current supplied thereto via the flash apparatus receptacle; and
(e) control means for maintaining a charging path in series with the rechargeable cell.

10. A charger as recited in claim 9, wherein the charging circuit includes a transformer.

11. A charger as recited in claim 10, wherein the plug means includes a flexible charging cord connected to the transformer at one end and having a flash apparatus receptacle compatible plug at the other end.

12. A charger as recited in claim 11, wherein the circuit means comprises a diode electrically connected in series between the negative terminal of the rechargeable cell and the negative terminal of the charging circuit.

13. Charging apparatus for charging an electrochemcial cell contained within a camera having a shutter release mechanism button and a flash bulb package receptacle comprising, in combination:
(a) a charging circuit having a positive terminal and a negative terminal and including a source of charging current and a transformer;
(b) plug means connected to the charging circuit terminals and adapted to be mechanically and electrically received by the flash bulb package receptacle and including a flexible charging cord connected to the transformer at one end and having a flash bulb package receptacle compatible plug at the other end;
(c) circuit means for providing a charging path in series with the rechargeable cell and comprising a diode electrically connected in series between the negative terminal of the rechargeable cell and the negative terminal of the charging circuit; and
(d) control means for maintaining a charging path in series with the rechargeable cell and comprising a switch operable by depression of the camera shutter release mechanism button and mechanical interlock means for maintaining said button in a depressed condition for charging the cell.

14. Charging apparatus for charging the electrochemical cells contained within a camera having a shutter release mechanism button and a flash apparatus receptacle comprising, in combination:
(a) a rechargeable cell housed within the camera and connected in circuit with the flash receptacle;
(b) a charging circuit having a positive terminal and a negative terminal and including a source of charging current;
(c) plug means connected to the charging circuit terminals and adapted to be mechanically and electrically received by the flash apparatus receptacles;
(d) circuit means for providing a charging path in series with at least one rechargeable cell, whereby the rechargeable cell may be recharged in situ via current applied thereto via the flash apparatus receptacle; and
(e) control means for maintaining a charging path in series with the rechargeable cell.

15. A charger as recited in claim 14, wherein the charging circuit includes a transformer.

16. A charger as recited in claim 15, wherein the plug means includes a flexible charging cord connected to the transformer at one end and having a flash apparatus receptacle compatible plug at the other end.

17. A charger as recited in claim 16, wherein the circuit means comprises a diode electrically connected in series between the negative terminal of the rechargeable cell and the negative terminal of the charging circuit.

18. Charging apparatus for charging the electrochemical cells contained within a camera having a shutter release mechanism button and a flash bulb package receptacle comprising, in combination:
(a) a charging circuit having a positive terminal and a negative terminal and including a source of charging current and a transformer;
(b) plug means connected to the charging circuit terminals and adapted to be mechanically and electrically received by the flash bulb package receptacle and including a flexible charging cord connected to the transformer at one end and having a flash bulb package receptacle compatible plug at the other end;
(c) circuit means for providing a charging path in series with at least one rechargeable cell and comprising a diode electrically connected in series between the negative terminal of the rechargeable cell and the negative terminal of the charging circuit; and
(d) control means for maintaining a charging path in series with the rechargeable cell and comprising a switch operable by depression of the camera shutter release mechanism button and mechanical interlock means for maintaining said button in a depressed condition for charging the cells.

* * * * *